United States Patent
Deciry

(10) Patent No.: US 7,452,157 B2
(45) Date of Patent: Nov. 18, 2008

(54) CONNECTING BUTT STRAPS FOR WIRE CABLE TRAYS WIRE CABLE TRAYS EQUIPPED WITH SAME WIRE CABLE TRAY ASSEMBLIES CONNECTED WITH SAME

(75) Inventor: James Deciry, Compiegne (FR)

(73) Assignee: ICM Group, Montbard (FR)

( * ) Notice: Subject to any disclaimer, the term of this patent is extended or adjusted under 35 U.S.C. 154(b) by 0 days.

(21) Appl. No.: 10/467,312

(22) PCT Filed: Feb. 12, 2002

(86) PCT No.: PCT/FR02/00525

§ 371 (c)(1),
(2), (4) Date: Aug. 6, 2003

(87) PCT Pub. No.: WO02/067398

PCT Pub. Date: Aug. 29, 2002

(65) Prior Publication Data

US 2004/0057783 A1    Mar. 25, 2004

(30) Foreign Application Priority Data

Feb. 16, 2001    (FR) .................................. 01 02163

(51) Int. Cl.
*H02G 3/06*    (2006.01)

(52) U.S. Cl. ................. 403/396; 403/389; 403/397; 211/133.5; 211/181.1; 174/64

(58) Field of Classification Search ............ 403/396, 403/397, 389; 174/48, 49, 60, 64, 68.1, 72 A, 174/72 R, 97, 100, 480, 481, 507, FOR. 108, 174/FOR. 107; 211/133.5, 181.1; 24/339; D8/394–396

See application file for complete search history.

(56) References Cited

U.S. PATENT DOCUMENTS

| D141,427 | S | * | 5/1945 | Peckerman | .................. D8/396 |
| 2,523,785 | A | * | 9/1950 | Sereno | ....................... 403/397 |
| 2,916,178 | A | * | 12/1959 | Arthur | ....................... 220/4.28 |
| 3,231,076 | A | * | 1/1966 | Freiman | ....................... 24/336 |
| 3,486,531 | A | * | 12/1969 | Nalodka | ....................... 24/339 |
| 3,497,249 | A | * | 2/1970 | Bois | ........................... 403/391 |
| 3,905,070 | A | * | 9/1975 | Macrae | ....................... 403/400 |

(Continued)

FOREIGN PATENT DOCUMENTS

| CA | 689646 | A | * | 6/1964 |
| DE | 7027573 | U | * | 2/1971 |
| DE | 79 21 266 | | | 1/1981 |
| DE | 19503429 | A1 | * | 9/1995 |
| EP | 0617493 | A1 | * | 9/1994 |
| EP | 0 905 843 | | | 3/1999 |
| EP | 1318585 | A1 | * | 6/2003 |
| FR | 2017070 | | * | 5/1970 |
| FR | 2 208 219 | | | 6/1974 |
| FR | 2599906 | A1 | * | 12/1987 |
| WO | WO 03049247 | A1 | * | 6/2003 |

*Primary Examiner*—Greg Binda
*Assistant Examiner*—Ernesto Garcia
(74) *Attorney, Agent, or Firm*—Young & Thompson

(57) ABSTRACT

A connecting butt strap connecting in series two wire cable trays (10, 20) consisting of two different types of wires, warp wires and weft wires, the connection of the two cable trays (10, 20) being produced via their abutted weft wires (12, 22): it comprises two clip-on elements adapted to clip the butt strap (30) on each of the abutted weft wires (12, 22), one of which enables the butt strap to be mounted rotatable (30) on one cable tray (10) and the other enables the two cable trays (10, 20) to be assembled, the butt strap (30) further comprising locking elements adapted to co-operate with a warp wire of the other cable tray (20) and to lock the butt strap (30) in its connecting position.

11 Claims, 5 Drawing Sheets

U.S. PATENT DOCUMENTS

| | | | |
|---|---|---|---|
| 4,337,034 A * | 6/1982 | Morgan et al. | 292/304 |
| D277,781 S * | 2/1985 | Weissenburger | D8/396 |
| 5,035,384 A * | 7/1991 | Werthmann | 403/233 |
| 5,244,422 A * | 9/1993 | Laricchia | 439/783 |
| 5,249,723 A * | 10/1993 | Lamadelein | 24/531 |
| 5,384,937 A * | 1/1995 | Simon | |
| 5,405,006 A * | 4/1995 | Burgdorf et al. | 220/485 |
| 5,492,295 A * | 2/1996 | Remmers | |
| 5,697,591 A * | 12/1997 | Cooper | 403/397 |
| 6,061,884 A * | 5/2000 | Ohms et al. | |
| 6,193,434 B1 * | 2/2001 | Durin et al. | |
| 6,247,871 B1 * | 6/2001 | Nickel et al. | 403/396 |
| 6,401,939 B1 * | 6/2002 | Durin | |
| 6,402,418 B1 * | 6/2002 | Durin et al. | |
| 6,575,315 B2 * | 6/2003 | Zidek | |
| 6,590,154 B1 * | 7/2003 | Badey et al. | 174/480 |
| 6,643,900 B2 * | 11/2003 | Jahrling | 24/563 |
| 2003/0108385 A1* | 6/2003 | Finco et al. | 403/396 |
| 2003/0156892 A1* | 8/2003 | Finco et al. | |
| 2004/0065459 A1* | 4/2004 | Spagnoli et al. | 174/48 |

* cited by examiner

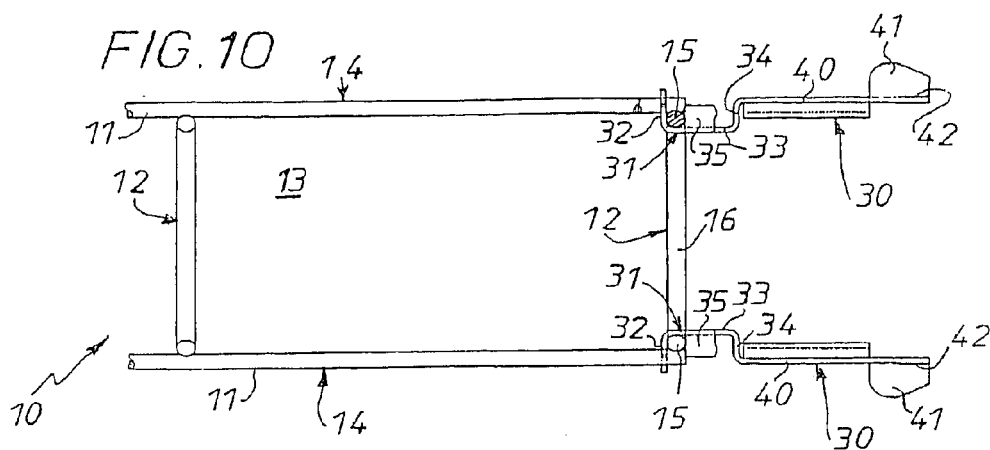
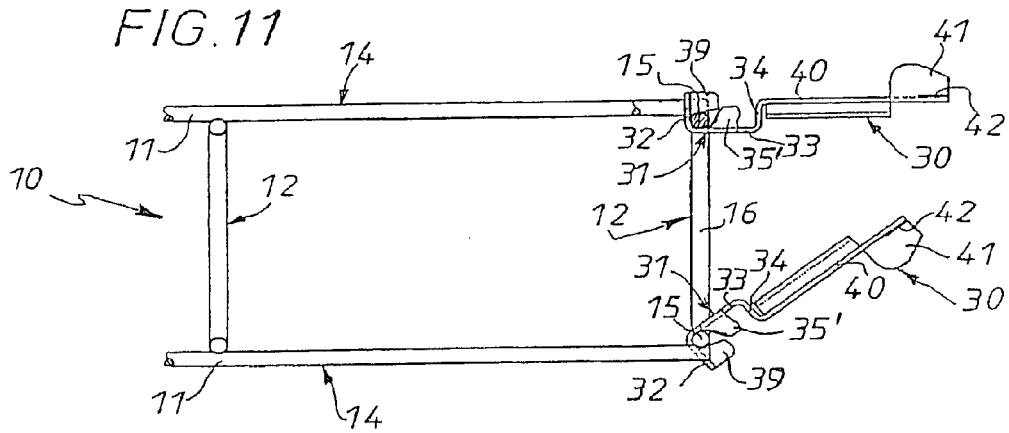
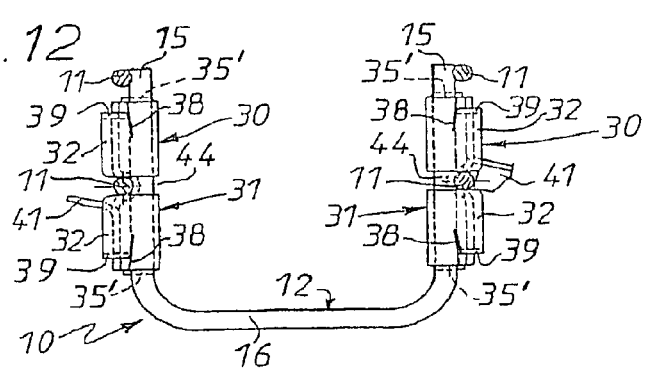

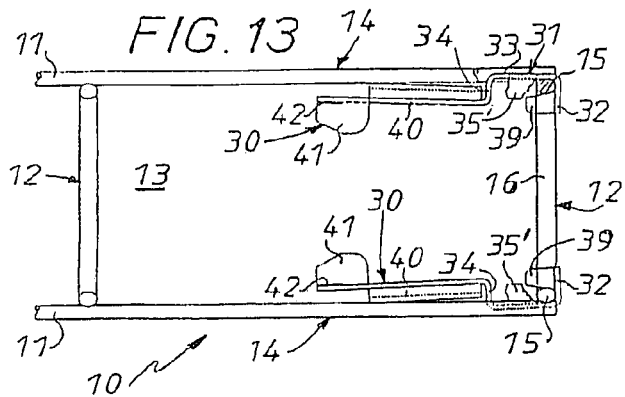
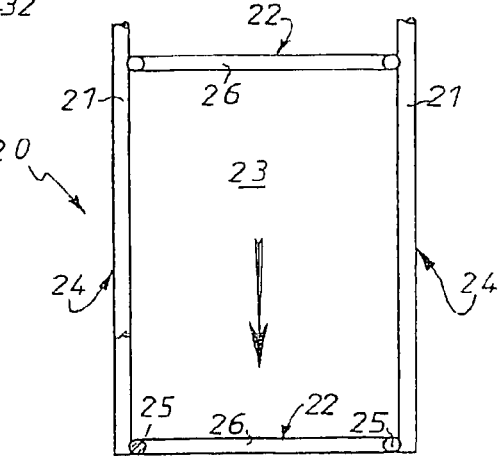
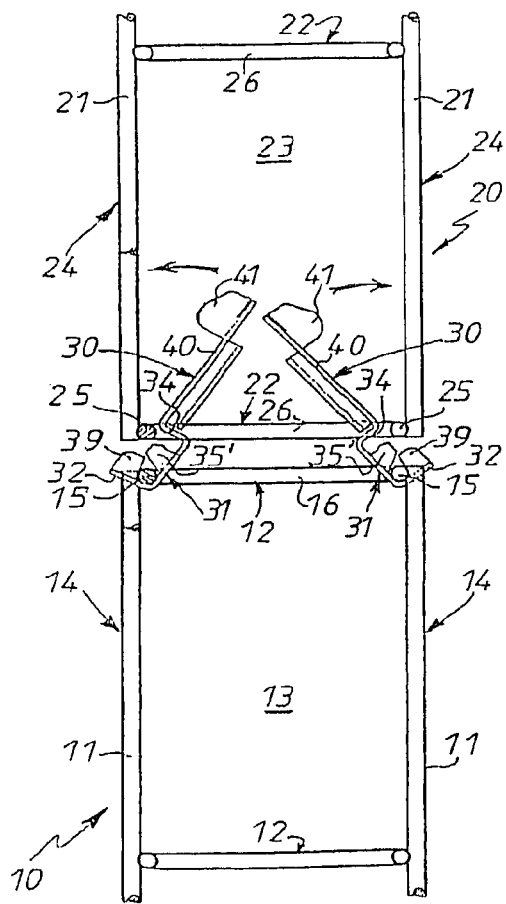
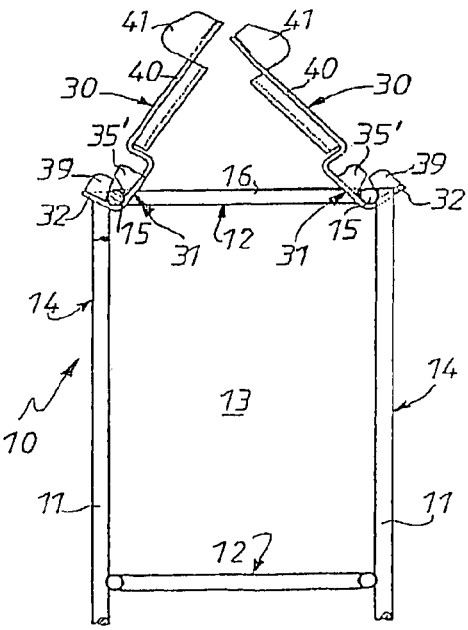

CONNECTING BUTT STRAPS FOR WIRE CABLE TRAYS WIRE CABLE TRAYS EQUIPPED WITH SAME WIRE CABLE TRAY ASSEMBLIES CONNECTED WITH SAME

BACKGROUND OF THE INVENTION

The present invention is generally concerned with wire cable trays.

As the person skilled in the art knows, wire cable trays comprise a mesh formed of wires of two different types, namely longitudinal wires, usually referred to as warp wires, which run longitudinally and in a rectilinear or quasi-rectilinear manner over the whole of their length, and, from place to place along these longitudinal wires, and appropriately attached thereto, transverse U-shaped wires, usually referred to as weft wires, the combination globally forming three panels which are in practice plane or substantially plane, namely a bottom panel and two lateral panels.

Wire cable trays of the above kind are routinely used in the manner of troughs to support, house and protect electrical or similar cables.

By "electrical cables" is meant here, and hereinafter, not only cables adapted to transport and distribute electrical power, but also cables and fibers adapted to transmit information electrically, optically or otherwise.

With regard to electrical cables, wire cable trays have many advantages that are appreciated by electrical installers, and in particular the advantages of easy installation, and therefore economy, flexibility, since the electrical cables can be brought out through any of their meshes, transparency, and thus of easy identification of the electrical cables, ventilation, cleanliness, safety, both for the electrical cable and for users, and performance.

SUMMARY OF THE INVENTION

An object of the present invention is to propose a connecting butt strap for connecting two of the above wire cable trays very quickly, without using screws or nuts and bolts, said connecting butt strap not being liable to cause any damage and being adapted to be premounted on one of the cable trays and even recovered after use.

According to the invention, a connecting butt strap for butt jointing two wire cable trays consisting of wires of two different types, namely warp wires and weft wires, said cable trays being connected by means of their end weft wires, is characterized in that it includes two clipping arrangements adapted to clip said connecting butt strap to each of said end weft wires, one of which arrangements allows the connecting butt strap to be rotatably mounted on a cable tray and the other of which arrangements allows the two cable trays to be assembled, said connecting butt strap further including locking means adapted to cooperate with a warp wire of the other cable tray and to lock said connecting butt strap in its connecting position.

The connecting butt strap advantageously includes a U-shaped body having two flanges and a core, the clipping arrangements being defined between the lateral edges of a clipping rim extending the core and lying generally perpendicular thereto and each of said flanges; the core of the U-shaped body has a clipping rim at each end; one flange of the U-shaped body has at its end near a clipping rim a slot defining a tongue adapted to be bent toward the interior of the U-shape of the U-shaped body.

One flange of the U-shape of the U-shaped body is preferably extended by a locking rim carrying a locking lug adapted to be bent over a warp wire to lock the connecting butt strap in a connecting position; the locking lug is carried by the locking rim in line with the edge of a groove in said locking rim; the locking rim is generally parallel to the core of the U-shape of the U-shaped body.

The groove is advantageously parallel to the clipping rim.

The connecting butt strap preferably includes a notch in the core and the flanges of the U-shape body and extending the groove.

Said lateral edges of the rim advantageously have, in the vicinity of their end, a protuberance preceded by an entry bevel, said protuberance defining with the flanges of the U-shaped body a passage whose width is less than the diameter of the weft wires.

The invention also provides a set of two wire cable trays connected by at least one of the above connecting butt straps; the connecting butt strap is clipped on either side of the clipping rim by the facing wings of the end weft wires of the two cable trays, the tongues being bent over said wings, a warp wire of one cable tray lying in the groove and the notch, and the locking lug being bent over said warp wire.

The invention further provides a wire cable tray fitted with at least one of the above connecting butt straps, said connecting butt strap being mounted to pivot about a wing of an end weft wire and lying inside the cable tray along its lateral panel defined in particular by said wing.

BRIEF DESCRIPTION OF THE DRAWINGS

To explain further the subject matter of the invention, embodiments of the invention shown in the appended drawings are described next by way of purely illustrative and nonlimiting example.

In the drawings:

FIG. 10 shows the fitting of the connecting butt straps to the first cable tray;

FIGS. 11 and 12 show the locking of the connecting butt straps in position on the first cable tray;

FIG. 13 shows the position of the connecting butt straps premounted on the first cable tray, which can be shipped in this condition;

FIGS. 14 and 15 show two steps of offering up a second cable tray to be connected to the first.

DETAILED DESCRIPTION OF THE PREFERRED EMBODIMENTS

Figure 1:
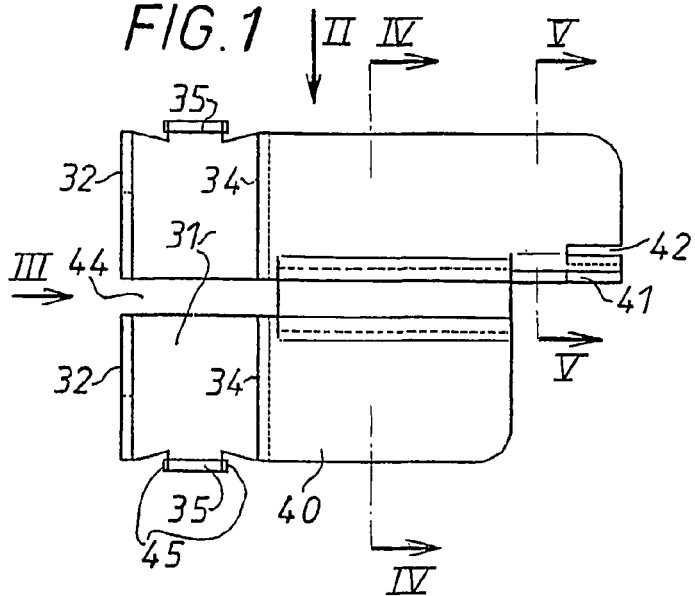
FIG. 1 is a plan view of a connecting butt strap according to the invention.
Figure 3:
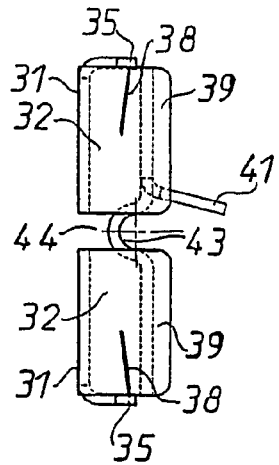
FIGS. 2 to 5 are views in the direction of the arrows II to V, respectively, in FIG. 1.
Figure 2:
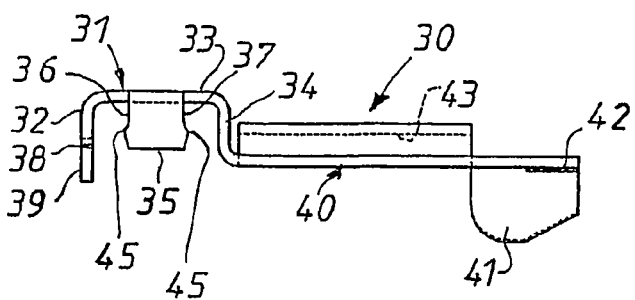
Figure 4:
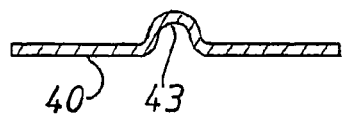
Figure 6:
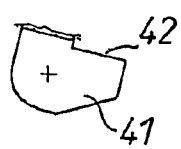
FIG. 6 is a view in the direction of the arrow VI in FIG. 5.
Figure 5:
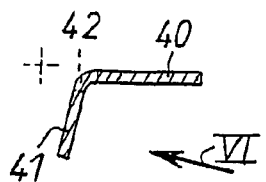
Figure 7:
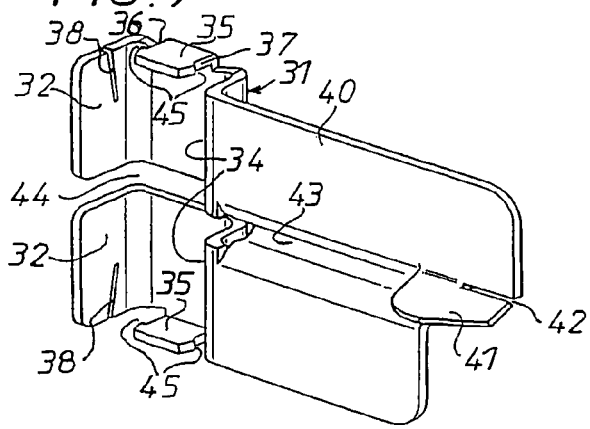
FIG. 7 is a perspective view of the connecting butt strap shown in FIGS. 1 to 6.
Figure 8:
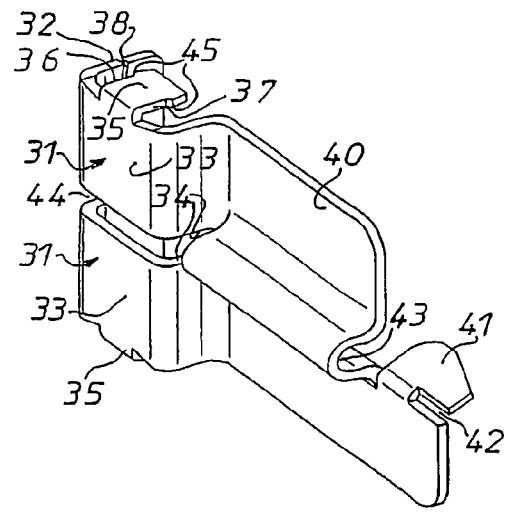
FIG. 8 is a view similar to FIG. 7, showing the connecting butt strap from a different angle.
Figure 9:
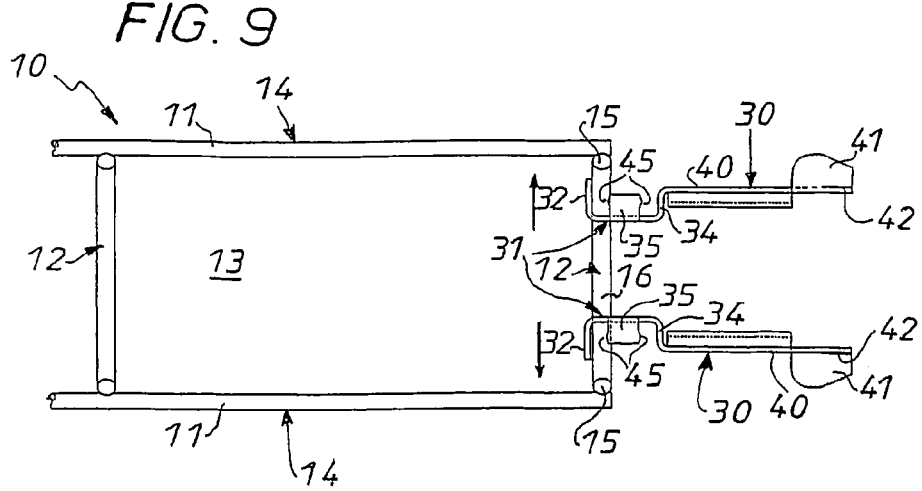
FIG. 9 shows the offering up of connecting butt straps before fitting to a first cable tray.

Referring to FIGS. 1 to 8, there is shown a connecting butt strap 30 for butt jointing two wire cable trays 10, 20 (see FIG. 14).

The wire cable trays 10, 20 comprise a mesh formed of wires of two different types, namely, in the case of the cable tray 10, longitudinal wires 11 that run longitudinally and in a rectilinear or substantially rectilinear manner over the whole of its length and, from place to place along the longitudinal wires 11, at a regular pitch and appropriately attached thereto, transverse U-shaped wires 12, the combination globally forming, in the manner of a trough, three panels 13, 14, namely a bottom panel 13 and two lateral panels 14. All this is known to the person skilled in the art.

In practice, the wires 11, 12 are metal wires, to be more specific steel wires, and they are welded together where they cross over.

Because of this method of construction, the wires 11, 12 cross at different levels; in this example, the longitudinal wires 11 are on the outside of the transverse wires 12.

In the embodiment shown, all the wires 11, 12 are round wires, i.e. have a circular cross section.

As shown here, the diameter of the cross section is the same for all the wires, but this is not necessarily always the case.

In the embodiment shown, the bottom panel 13 has no longitudinal wire 11 and each lateral panel comprises only two longitudinal wires 11, namely an intermediate longitudinal wire 11, at substantially half its height, and an edge longitudinal wire 11.

However, the number of longitudinal wires 11 can of course be different; similarly, the bottom panel 13 can incorporate any number of longitudinal wires 11.

The cable tray 20 is identical to the cable tray 10 and its component parts are identified by reference numbers derived from those of the cable tray 10 by adding 10 thereto.

The traverse wire 12, 22 being U-shaped, the have Wings 15, 25 and cores 16, 26, respectively.

As the person skilled in the art knows, the longitudinal wires 11, 21 are usually referred to as warp wires and the transverse wires 12, 22 as weft wires.

To butt joint the cable trays 10, 20, they are prepared so that, at the end at which they are to be butt jointed, the warp wires are cut off in line with the end weft wire, which is then at the end of the corresponding cable tray, as can be seen in the figures.

The connecting butt strap 30 includes clipping means adapted to clip said connecting butt strap 30 to the weft wires 12 and 22 at the ends of the cable trays 10 and 20.

The connecting butt strap 30 comprises a U-shape body 31 having two flanges 32, 34 and a core or intermediate portion 33 between the two flanges 32, 34.

The core 33 is extended by a clipping rim or tab 35 globally perpendicular to the core 33 and to the flanges 32, 34 of the U-shape body 31.

Here, the core 33 of the U-shaped body 31 has a clipping rim 35 at each end.

The clipping means or clipping arrangement are defined between, on the one hand, the lateral edges 36, 37 of the clipping rim 35 and, on the other hand, each of the flanges 32, 34 of the U-shaped body 31, so that lateral edge 36 and flange 32 form a first portion of the clipping arrangement, and lateral edge 37 and flange 34 form a second portion of the clipping arrangement.

To be more precise, the lateral edges 36, 37 are at a distance from the flanges 32, 34 that is globally equal to or very slightly greater than the diameter of the weft wires 12, 22, and the clipping function is assured by a protuberance 45 preceded by an entry bevel which have said lateral edges 36, 37 in the vicinity of their end, said protuberance 45 defining with the flanges 32, 34 a passage whose width is less than the diameter of the weft wires 12, 22.

Thus it is possible to clip a connecting butt strap 30 to each wing 15 of the weft wire 12 at the end of the cable tray 10, from the interior toward the exterior, as shown in FIGS. 9, 10 and 14 to 16.

Clipping the connecting butt straps 30 to each of the wings 15 of the weft wire 12 enables said connecting butt straps 30 to rotate about said wings 15.

To reinforce this clipping, the flange 32 that retains the clip 30 incorporates a slot 38 defining a tongue 39 adapted to be bent over the wing 15 of the weft wire 12 until it is practically perpendicular to the flange 32, as can be seen in FIGS. 11 and 12; the slot 38 is advantageously slanted so that the diameter of the weft wire 12 is immaterial; in FIG. 11, the tongues 39 of both connecting butt straps 30 are bent; in FIG. 12, the tongues 39 of the connecting butt strap 30 are shown bent.

The flange 34 of the U-shaped body 31 is extended by a locking element embodied by a locking or latching rim 40; in the embodiment shown in the figures, the locking rim 40 is generally parallel to the core 33 of the U-shape of the U-shaped body 31.

The locking rim 40 carries a locking lug 41 in line with the edge of the groove 43 in said locking rim 40.

The locking rim 40 is generally parallel to the core 33 of the U-shape of the U-shaped body 31 and the groove 43 is parallel to the clipping rim 35 and at substantially half its height relative to the flanges 32, 34 of the U-shaped body 31, to which it is substantially perpendicular.

In the embodiment shown, the locking rim 40 extends the flange 34 of the U-shaped body 31 over the full height thereof.

Relative to the locking rim 40, the bottom of the groove 43 extends from the same side as the core 33 of the U-shaped body 31 and the locking lug 41 is on the opposite side; thanks to this arrangement, the locking lug 41 can be bent at 42 over a wire lying in said groove 43, in this example a warp wire, to lock the connecting butt strap 30 relative to said wire in the connection position, as explained below.

The groove 43 is extended by a notch 44 in the core 33 and the flanges 32 and 34 of the U-shaped body 31 for the warp wire to pass through.

The two connecting butt straps 30 being mounted to rotate about the wings 15 of the weft wire 12 at the end of the cable tray 10, as can be seen in FIGS. 11 and 12, it suffices to pivot them toward the interior of the cable tray 10, in particular so that they lie along the lateral panels 14, in a storage position, as can be seen in FIG. 13, and the cable tray 10 can be shipped in this configuration, with the connecting butt straps pre-mounted.

To connect the cable tray 10 to an identical cable tray 20, the connecting butt straps 30 are deployed outward, by rotating them about the wings 15 of the end weft wire 12, the cable tray 20 is moved toward the cable tray 10, and the connecting butt strap 30 is inserted into the cable tray 20, as can be seen in FIGS. 14 and 15.

Figure 16:
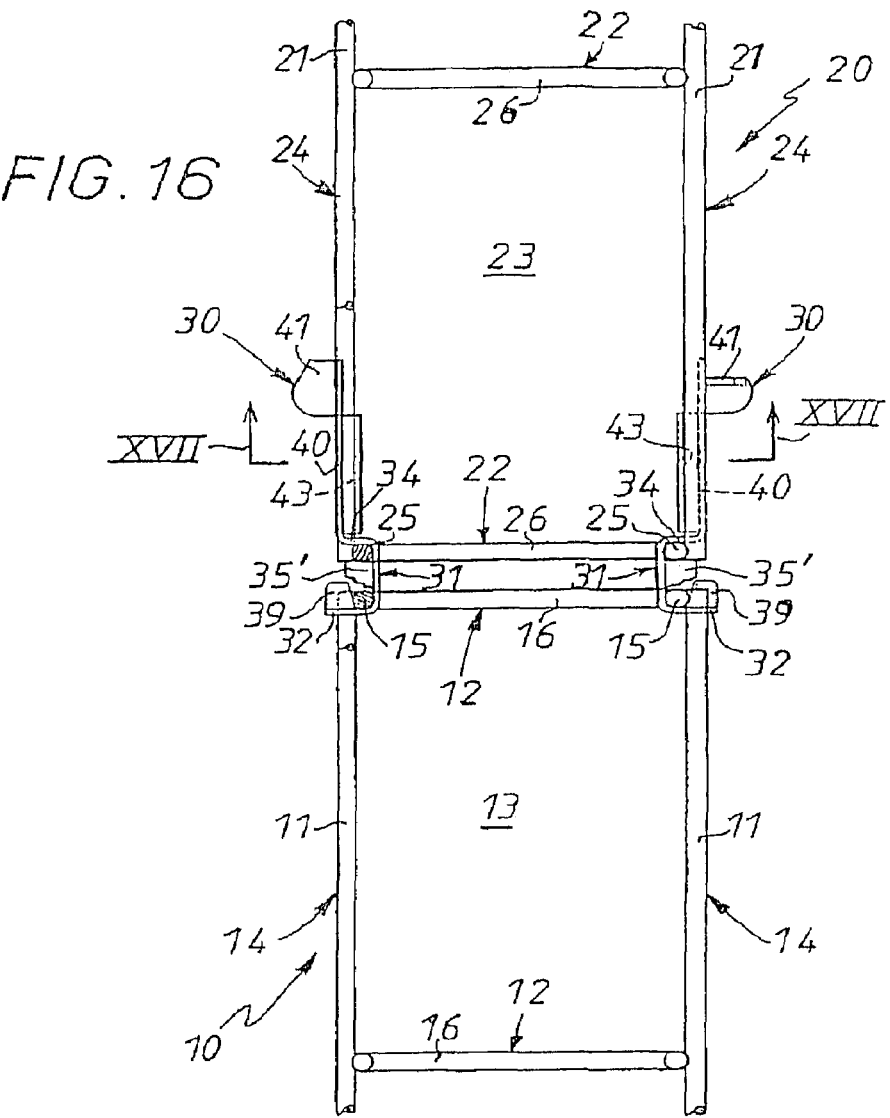
FIGS. 16 and 17 show the fitting and locking of the connecting butt straps to the second cable tray, FIG. 17 being a view in section taken along the line XVII-XVII in FIG. 16.
Figure 17:
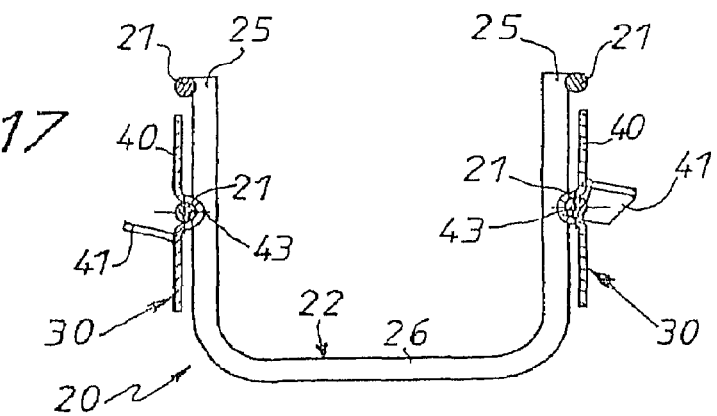

The connecting butt straps 30 are turned further outward until the flange 34 and the clipping rim 35 overlap until the wing 25 of the weft wire 22 of the cable tray 20 is clipped and until the groove 43 caps the warp wire 24 of the cable tray 20, as can be seen in FIGS. 16 and 17; in this position, the locking lug 41 extends toward the exterior of the cable tray 20; it suffices to bend this lug to lock the connecting butt strap to the warp wire 24; FIG. 16 shows the locking lug 41 of the upper connecting butt strap 30 before bending and that of the lower connecting butt strap 30 after bending.

FIGS. 11-17 show an alternate clipping tab 35'.

The invention claimed is:

1. A connecting butt strap for butt jointing a first and a second wire cable tray, each wire cable tray of the two wire cable trays comprising warp wires and weft wires including end weft wires, said connecting butt strap comprising:
  a body having two opposing flanges and an intermediate portion between said two flanges;
  a clipping tab extending from said intermediate portion, a first lateral edge of said clipping tab and a first one of said two flanges defining a first clipping portion therebetween adapted for clipping said connecting butt strap to a first end weft wire of the first wire cable tray;
  a tongue extending from a distal end of one of said two flanges, aligned with said first one of said two flanges and adapted to be bent over the first end weft wire of the first wire cable tray, said first clipping portion and said tongue being adapted for rotatably mounting the connecting butt strap on the first wire cable tray; and
  a second opposing lateral edge of said clipping tab and a second one of said two flanges defining a second clipping portion therebetween adapted for engagement with a first end weft wire of the second wire cable tray for assembling the first and second wire cable trays together; and
  a locking rim connected to the other one of said two flanges and co-operable with a warp wire of the second wire cable tray to maintain said connecting butt strap in a connecting position when said second clipping portion is in engagement with the first end weft wire of the second wire cable tray,
  wherein said locking rim comprises a locking lug adapted to be bent over a warp wire to lock the connecting butt strap in the connecting position, and
  wherein the locking lug is in alignment with a longitudinal groove in said locking rim.

2. The connecting butt strap according to claim 1, wherein said clipping tab is generally perpendicular to said intermediate portion.

3. The connecting butt strap according to claim 2, further comprising another clipping tab, said clipping tab and said another clipping tab extend from a respective end of said intermediate portion.

4. The connecting butt strap according to claim 2, wherein the body is a U-shaped body and said one of said two flanges has a slot defining said tongue, said tongue being adapted to be bent inwardly of the U-shaped body.

5. The connecting butt strap according to claim 2, wherein the body is a U-shaped body and protuberances are provided proximate to a free end of the clipping tab, the protuberances and the two flanges of the U-shaped body defining passages.

6. The connecting butt strap according to claim 1, wherein the body is a U-shaped body and the locking rim is in a plane that is generally parallel to a plane of the intermediate portion of the U-shaped body.

7. The connecting butt strap according to claim 1, wherein the groove extends in a plane that is generally parallel to a plane through said clipping tab extending from said intermediate portion and being generally perpendicular thereto.

8. The connecting butt strap according to claim 1, wherein the body is a U-shaped body and further comprising a notch in the intermediate portion and the flanges of the U-shaped body and in alignment with the groove.

9. A connecting butt strap in combination with a wire cable tray, wherein wire cable tray is fitted with at least one connecting butt strap according to claim 1, said connecting butt strap being pivotally mounted on an end weft wire of said wire cable tray and having a retracted position in which said connecting butt strap is received inside the cable tray along a lateral panel.

10. A set of at least two wire cable trays in combination with at least one connecting butt strap, the wire cable trays comprising a first wire cable tray and a second wire cable tray, each of the wire cable trays comprising warp wires and weft wires including end weft wires, said connecting butt strap being movable from a disconnected position where said and second wire cable trays are separated from each other to a connected position where said first and second wire cable trays are connected to each other, said connecting butt strap comprising:
  a U-shaped body having two flanges and an intermediate portion between said two flanges;
  a first clipping tab extending from said intermediate portion, a first lateral edge of said first clipping tab and a first one of said two flanges defining a first clipping portion therebetween that clips said connecting butt strap to a first one of said end weft wires of said first wire cable tray,
  a tongue extending from one of said two flanges and being bent over said first end weft wire, said first clipping portion and said tongue rotatably mounting the connecting butt strap on said first wire cable tray;
  a second opposing lateral edge of said first clipping tab and a second one of said two flanges defining a second clipping portion therebetween, which is spaced apart from said first clipping portion, said second clipping portion engaging a second one of said end weft wires of said second wire cable tray to assemble the two wire cable trays together;
  a locking rim connected to one of said first and second clipping portions that connects to a warp wire of the second wire cable tray to lock a said connecting butt strap in a connected position where said second clipping portion engages said second one of said end weft wires; and
  a second clipping tab, said first and second clipping tabs extending from a respective end of said intermediate portion and lying generally perpendicular thereto, the first and second clipping portions being defined between lateral edges of said clipping tabs and each of said flanges, one of said two flanges of said U-shaped body has, proximate to said second clipping tab, a slot defining said tongue, said tongue being bent inwardly of the U-shaped body,
  wherein said locking rim includes a locking lug in alignment with an edge of a groove in said locking rim, the locking lug being generally parallel to the intermediate portion of the U-shaped body, the groove being generally parallel to the second clipping tab,
  said intermediate portion and the two flanges of the U-shaped body having a notch in alignment with the groove, said notch separating the two flanges and the intermediate portion into two pairs of flanges and two intermediate portions, a protuberance being provided proximate to a free end of the first and second clipping tabs, the protuberance defining with the flanges of the U-shaped body passages.

11. The set of at least two wire cable trays according to claim 10, wherein the connecting butt strap is clipped on either side of said second clipping tab by the end weft wires of the two cable trays, the tongue being bent over the end weft wires, a warp wire of one of said cable trays being received in the groove and the notch, and the latching lug being bent over said warp wire.

* * * * *